United States Patent [19]

Passa

[11] Patent Number: 4,624,164
[45] Date of Patent: Nov. 25, 1986

[54] HYDRAULIC SHEARING MACHINE

[75] Inventor: René Passa, Valmondois, France

[73] Assignee: Promecam Sisson-Lehmann, Saint-Denis, France

[21] Appl. No.: 727,608

[22] Filed: Apr. 26, 1985

[30] Foreign Application Priority Data

May 17, 1984 [FR] France ................ 84 07637

[51] Int. Cl.$^4$ ............... B23D 15/08; B23D 15/12
[52] U.S. Cl. .................................. 83/542; 83/583; 83/639; 83/636; 83/698; 83/543
[58] Field of Search ............... 83/636, 694, 821, 825, 83/588, 583, 596, 642, 698, 542, 543

[56] References Cited

U.S. PATENT DOCUMENTS

| | | | |
|---|---|---|---|
| 1,139,572 | 5/1915 | Perry | 83/636 X |
| 1,140,897 | 5/1915 | Frank | 83/698 |
| 2,539,602 | 1/1951 | Wehr | 83/694 |
| 2,734,572 | 2/1956 | Pater | 83/694 |
| 3,791,248 | 2/1974 | Pearson | 83/694 X |
| 4,114,491 | 9/1978 | Hashimoto et al. | 83/596 X |

Primary Examiner—James M. Meister
Assistant Examiner—John L. Knoble
Attorney, Agent, or Firm—Young & Thompson

[57] ABSTRACT

A hydraulic shearing machine for cutting steel sheets and the like in which the lower blade is fixed between two vertical end-plates of the frame while the upper blade is carried by a movable apron. The support provided for the lower cutting blade consists of a hollow box which extends horizontally between the vertical end-plates of the shearing-machine frame and only the ends of which are attached to the frame. The lower blade is fixed against one of the side walls of the support box so as to be displaced with respect to the theoretical center of rotation of said support box about its own axis. In consequence, the vertical forces exerted on the lower blade at the time of utilization of the shearing machine tend to produce a twisting movement of the support box, thus providing compensation for the horizontal flexural displacement of the box under the action of the horizontal forces. The movable upper apron of the shearing machine is preferably upwardly inclined in order to enhance the buckling action of the apron and to induce a forward displacement of the upper blade, thus having a contributory effect in reducing the clearance between the blades.

2 Claims, 13 Drawing Figures

U.S. Patent  Nov. 25, 1986  Sheet 1 of 4  4,624,164
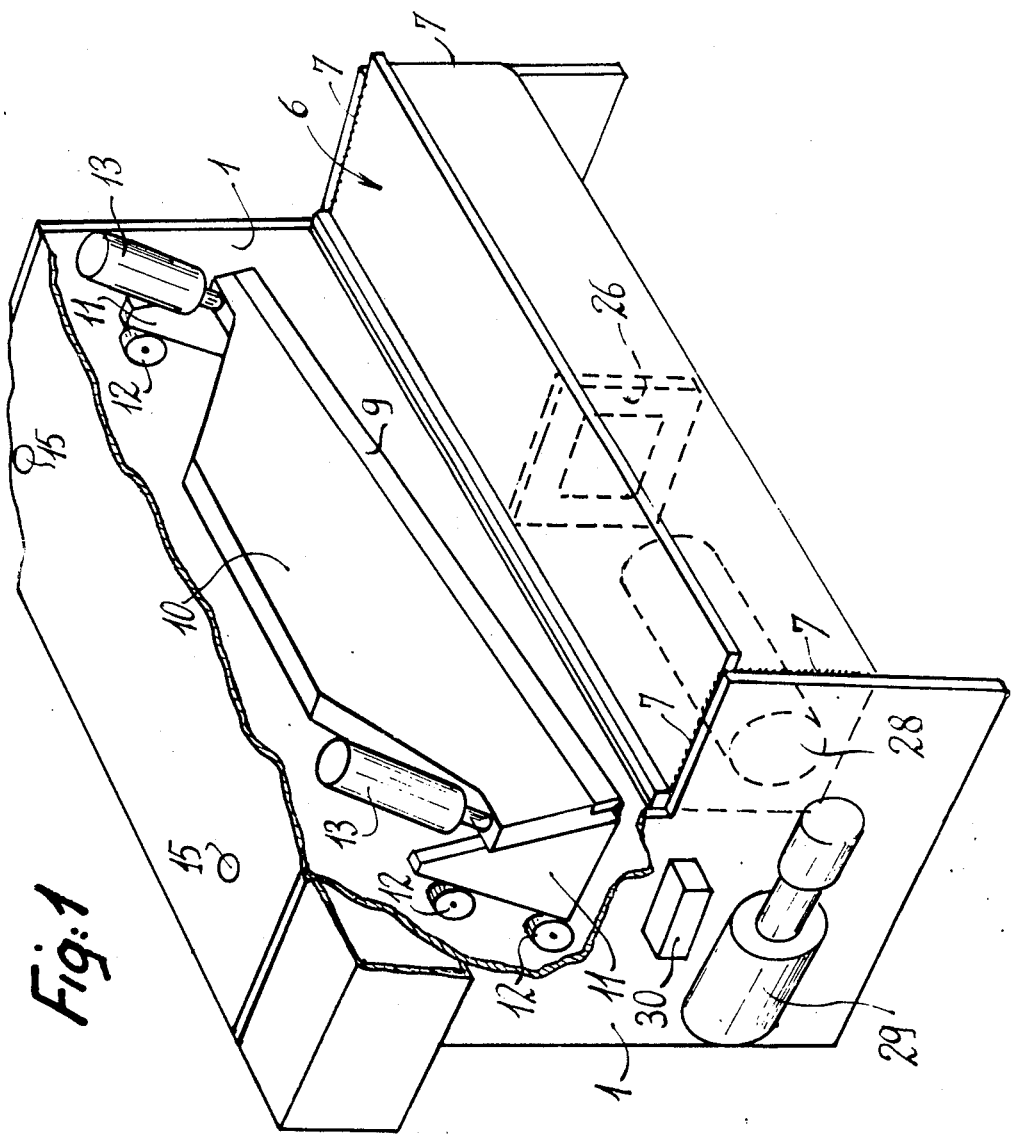

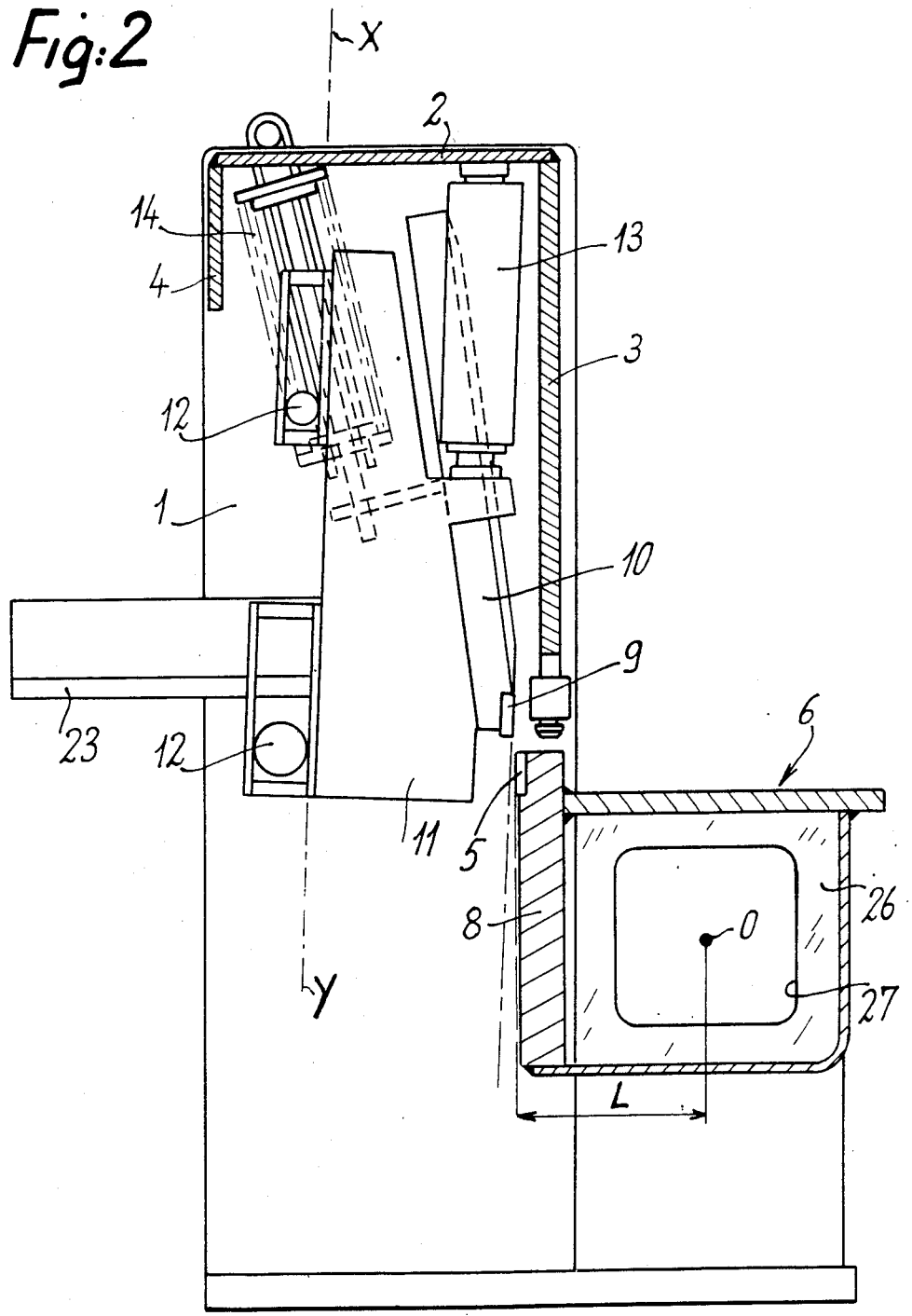

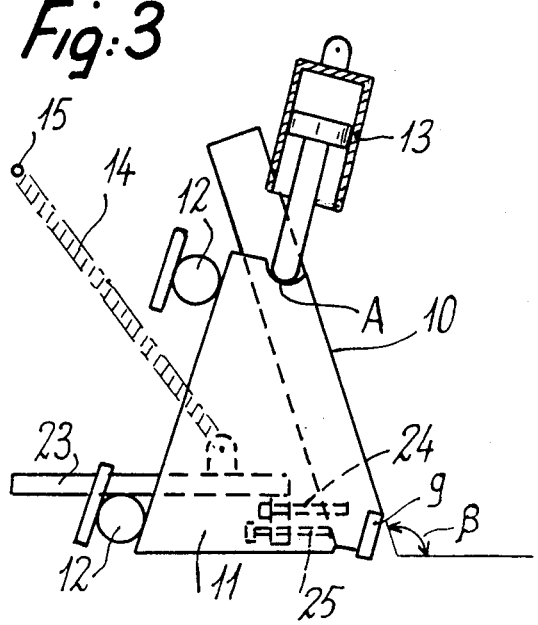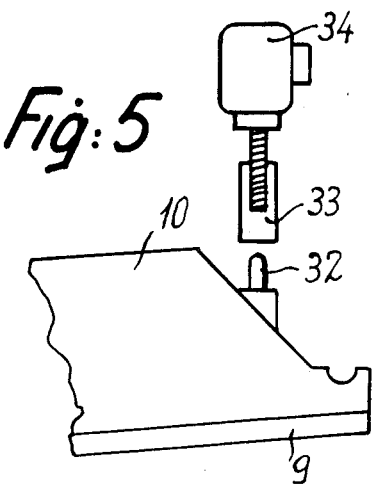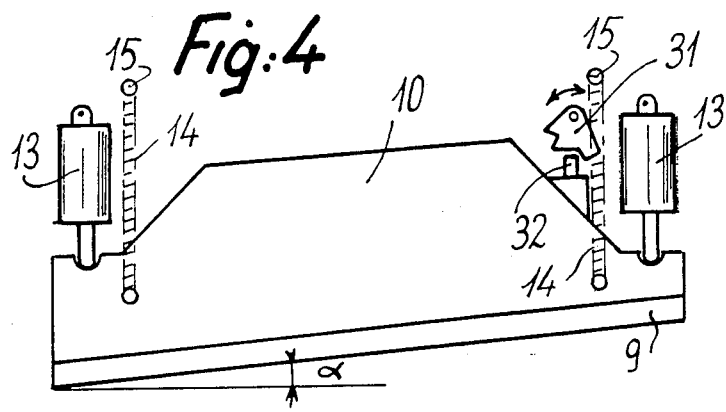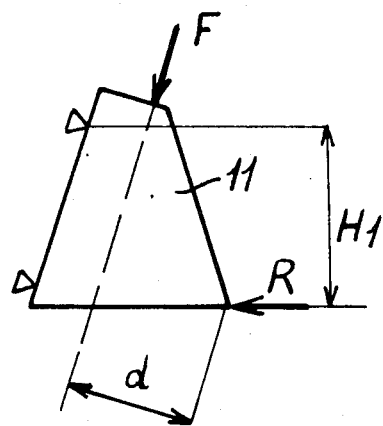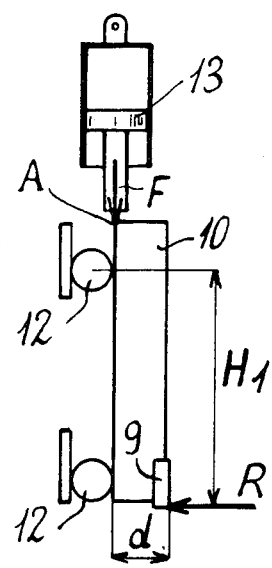

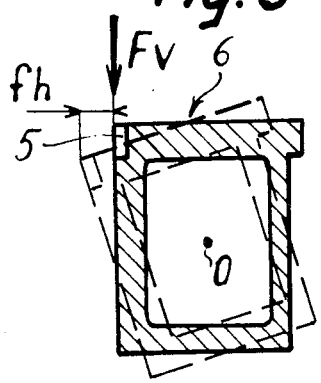
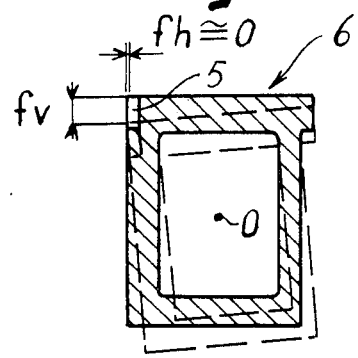
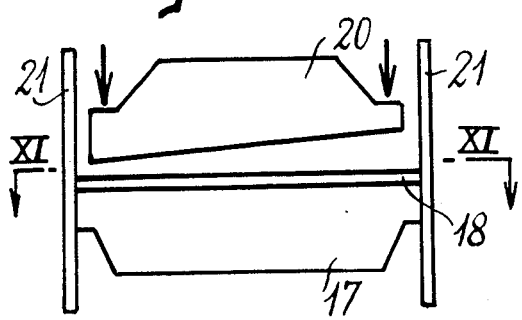
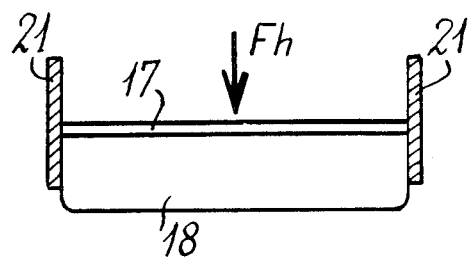
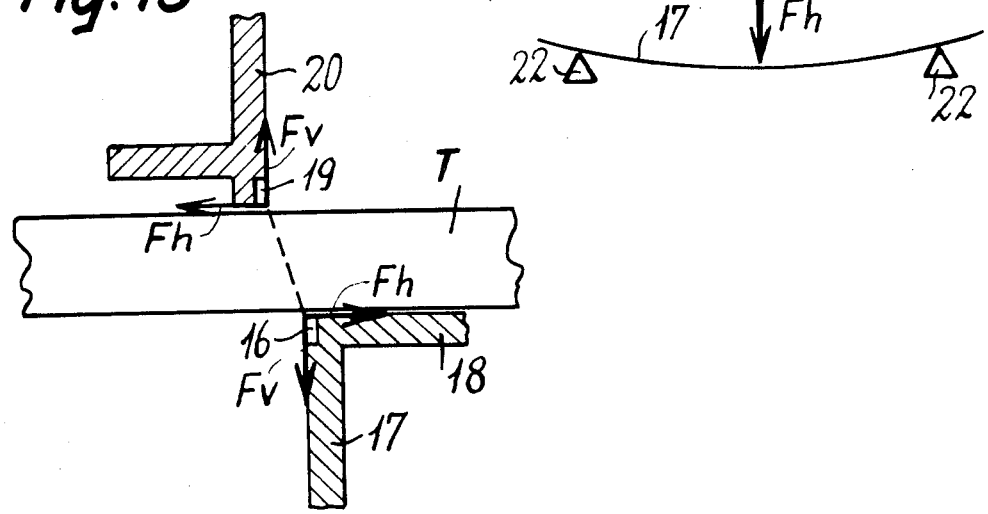

HYDRAULIC SHEARING MACHINE

BACKGROUND OF THE INVENTION

1. Field of the Invention

This invention relates to hydraulic shearing machines employed for shearing steel sheets or the like.

2. Description of the Prior Art

Shearing machines of this type comprise two blades, namely a lower blade fixed between two vertical end-plates of the frame and an upper blade carried by a movable apron. When seen from the front, the upper blade is placed obliquely in order to be inclined on one side and thus to ensure that a shearing operation to be performed on a steel sheet begins near one edge of this latter and continues toward the other edge, progressively as the apron moves downwards.

In current shearing machines of this type, the lower blade is fixed against the top edge of a vertical apron which extends between the two end-plates of the frame, said apron being rigidly fixed to a horizontal table which is intended to support the steel sheets to be sheared. During operation of a shearing machine of this type, however, reactions of resistance to cutting are exerted in a vertical direction and in a horizontal direction. These reactions have a tendency to cause horizontal and vertical flexural displacements of the stationary and movable aprons. However, the vertical flexural displacements give rise only to simple problems of resistance to bending stresses, or fatigue strength.

The horizontal flexural displacements, however, have a tendency to separate the two cutting blades horizontally. In consequence, the clearance between these blades increases, thus modifying the cutting geometry and giving rise to an increase in the horizontal reaction. The system is therefore cumulative and produces poor cutting results (mainly rough edges and burrs).

For this reason, the object of the present invention is to provide a shearing machine which is so designed as to reduce the clearance between the cutting blades in order to obtain good cutting conditions.

SUMMARY OF THE INVENTION

To this end, the invention first utilizes the vertical forces exerted on the stationary lower blade in order to compensate for the horizontal flexural displacement of the blade support. However, the present invention also utilizes the effect of buckling of the upper apron in order to reduce the clearance between the cutting blades and comprises a certain number of additional improvements.

In accordance with a first distinctive feature of the shearing machine contemplated by the invention, the support provided for the lower blade of the shearing machine consists of a hollow box which extends horizontally between the two vertical end-plates of the frame, said lower blade being fixed against one of the side walls of said box in such a manner as to be displaced with respect to the theoretical center of rotation of the box at the time of a twisting movement of said box about its own axis.

Thus the vertical forces exerted on the stationary cutting blade are applied on the corresponding edge of said support box, thus tending to produce a torque. In point of fact, the resultant deformation has a tendency to draw the cutting edge of the stationary blade towards the movable blade, thus reducing the clearance between the blades.

In accordance with another distinctive feature of the shearing machine under consideration, the movable upper apron of the shearing machine is rearwardly inclined from the bottom of said apron in order to enhance the buckling action of said apron and to induce a forward displacement of the upper blade for the purpose of making a further contribution to the reduction in the clearance between the blades.

BRIEF DESCRIPTION OF THE DRAWINGS

Other features of the invention will be more apparent upon consideration of the following description and accompanying drawings, wherein:

FIG. 1 is a schematic view in perspective of a shearing machine in accordance with the invention;

FIG. 2 is a transverse sectional view of the shearing machine;

FIG. 3 is a schematic view in end elevation showing one embodiment of a movable upper apron of the shearing machine;

FIG. 4 is a schematic front view of the movable apron of said shearing machine;

FIG. 5 is a fragmentary schematic view of another alternative embodiment of said apron, the apron being shown in a front view;

FIGS. 6 and 7 are diagrams illustrating the conditions of equilibrium of the movable apron of the present shearing machine;

FIGS. 8 and 9 are schematic transverse sectional views illustrating the conditions of deformation of the hollow box which serves as a support for the movable lower blade of the shearing machine in accordance with the invention;

FIG. 10 is a schematic front view of a conventional shearing machine;

FIG. 11 is a schematic sectional view of the same conventional shearing machine, this sectional view being taken along line XI—XI of FIG. 10;

FIG. 12 is a diagram illustrating the conditions of deformation of the lower apron of a shearing machine of the same type under the action of horizontal stresses sustained by this latter;

FIG. 13 is a schematic vertical sectional view illustrating the horizontal and vertical stresses sustained by the two aprons (stationary and movable) of a conventional shearing machine.

DESCRIPTION OF THE PREFERRED EMBODIMENTS

The frame of the shearing machine shown in FIGS. 1 and 2 comprises two end-plates 1 having a generally L-shaped contour and disposed in two parallel vertical planes. Said two end-plates are connected to each other at their upper ends by means of panels 2, 3 and 4 which virtually constitute an open box having the shape of an inverted U. For the sake of greater clarity of FIG. 1, the front panel 3 has not been shown in this figure.

The support provided for the stationary lower blade 5 of the shearing machine in accordance with the invention consists of a closed hollow box which is generally designated by the reference numeral 6 and which extends horizontally on the front side of said shearing machine between the lower arms of the two end-plates 1. Said box is secured to the frame of the present shearing machine solely at its two ends, namely by welding its end faces against the internal faces of the two end-plates 1 by means of weld fillets 7.

The lower blade 5 is fixed near the top edge of one of the side walls of the stationary blade support box 6, namely the inwardly-directed vertical wall 8. In consequence, the position of said lower blade is set back at a distance L with respect to the center O of the hollow box 6 which has the function of a blade support. Thus, as has already been mentioned and as will hereinafter be explained in greater detail, this arrangement permits profitable use of the vertical forces exerted on the stationary blade with a view to compensating for the deformations of its support in the horizontal direction.

The movable upper blade 9 of the shearing machine in accordance with the invention is fixed on the lower edge of a movable apron 10 which is provided with two vertical end-cheeks 11 placed opposite to the end-plates 1 of the frame.

It is worthy of note that the movable apron 10 is not placed in a vertical plane but in a plane which is rearwardly inclined from the bottom. This plane is inclined to the horizontal at an obtuse angle $\beta$ of the order of 92° to 110°, for example 98°. The guide ramps provided on the rear edges of the end-cheeks and displaceable in contact with two fixed runner-wheels 12 are set at a reverse angle of slope with respect to said apron 10. For the sake of enhanced clarity of the drawings, these angles of slope have been purposely increased in FIG. 3.

Downward displacement of said movable apron is controlled by two hydraulic jacks 13 placed at each end. The upward return motion of the apron is produced by restoring springs 14 which act in tension. These springs are placed diagonally in order to pull said apron both upwards and to the rear (as shown in FIG. 3), the top points 15 of attachment of said springs being indicated in FIG. 1.

The inclination of the movable upper apron 10 is intended to prevent any increase in the clearance between the two blades of the shearing machine in accordance with the invention. This was already the object of the particular mode of assembly of the stationary blade on the frame.

In order to gain a clear idea of the role played by the assembly of the stationary blade on the support box 6, it will first of all prove useful to consider the operating conditions of a conventional shearing machine of the type illustrated in the diagrams of FIGS. 10 to 13. In a shearing machine of this type, the lower blade 16 is fixed against the top edge of a vertical apron 17. The ends of said vertical apron are attached to two end-plates of the frame, said apron being rigidly fixed to a horizontal table 18 arranged at right angles. In regard to the upper blade 19, this blade is carried by the bottom edge of a movable apron 20 placed between the two end-plates 21 of the frame.

As illustrated in FIG. 13, the reactions of resistance to cutting at the time of shearing of a steel sheet T have the effect of subjecting each blade 16 and 19 to horizontal and vertical forces Fh and Fv respectively. In view of the fact that the horizontal reactions are exerted in opposite directions on the upper apron and on the lower apron, this has the effect of increasing the clearance between the two blades 16 and 19. As shown in the diagram of FIG. 12, the apron 17 then undergoes a horizontal deflection in the same manner as a simple beam whose ends rest on two support points 22. The deformation of said apron therefore corresponds to the flexure formula of a beam supported at both ends with maximum deflection at the center.

Taking into account the fact that the horizontal reactions have an order of magnitude of 20% of the vertical force or so-called "cutting force", the arrangement provided in the shearing machine in accordance with the invention is intended to utilize this vertical force in order to compensate for the horizontal flexural displacement referred-to earlier. This result is achieved by virtue of the fact that, in the shearing machine contemplated by the invention, the stationary blade 5 is fixed on one of the side walls of a hollow support box 6 in a position which is displaced with respect to the theoretical center O of rotation of said box when this latter is subjected to a torsional stress.

In fact, as illustrated in FIG. 8, the vertical force Fv which is exerted on the stationary blade 5 accordingly produces a torque which tends to cause twisting of the support box 6 about its own center O. This accordingly has the effect of bringing the cutting edge of the blade 5 nearer the movable blade 9. It is then only necessary to calculate the inertia forces as well as the length of the lever-arm L in order to ensure that this rotation is substantially of the same order of magnitude as the horizontal deflection of the support of the blade 5. Thus, as illustrated in FIG. 9, there is practically no longer any horizontal displacement of the cutting edge of the lower blade 5, thereby obtaining conservation of the cutting geometry and consequently achieving an improvement of the results.

As mentioned earlier, the inclination of the upper apron 10 is intended not only to enhance the apron-buckling effect but also to contribute to a reduction in the clearance between the cutting blades.

However, in order to ensure that the horizontal reaction does not cause flexural deformation of said apron and its guiding elements, the point of application A of the jacks 13 on the top edges of the end-cheeks 11 of the upper apron 10 is displaced in the rearward direction with respect to the position of the movable blade 9 (as shown in FIG. 3 as well as in the theoretical diagram of FIG. 6). By virtue of the vertical reaction of the steel sheet to be cut, this produces a couple which has a tendency to advance the upper blade 9 and consequently to reduce the clearance between the blades.

In order to prevent frictional contact between the blades, only the horizontal cutting reaction R is intended to be utilized. It is accordingly sufficient to comply with the ratio $R \geq (F \cdot d)/H_1$ in order to prevent any frictional contact of the blades.

Steps are taken to ensure that the equilibrium force is very close to $R_1$, with the result that the horizontal reactions on the apron and its guide members are very small under all circumstances since there exists a relationship between R and F such that $R \approx 0.2 F$. It is therefore only necessary to make a suitable choice of the ratio $d/H_1$ in order to ensure that the equilibrium is always maintained (see FIG. 7).

In order to prevent flexural displacement of the upper apron 10 at the midpoint of its length, a rearwardly-extending horizontal table 23 is added to said apron. As shown in FIG. 3, the apron 10 and table 23 are assembled together in rigidly fixed relation by means of two series of screws 24 and 25 which are spaced at intervals along the entire length and correspond respectively to tension screws and to thrust screws. This system makes it possible to adjust the linearity of the upper blade and to prevent twisting of the complete assembly.

The combination of the two distinctive features described in the foregoing, namely: mounting of the stationary cutting blade on a support box which is capable of undergoing a movement of torsional displacement or twisting about its own axis and the inclined position of the movable upper apron offers highly advantageous results from a technical standpoint as well as in regard to capital economy. In fact, the sum of horizontal deformations (which have the most unfavorable effect on the good performance of cutting operations) have been reduced in a ratio of more than ten whilst the weight of the entire assembly is reduced by 10%, all other conditions being equal.

In regard to the deformations which are liable to take place, it should be noted that, although the forces acting in opposition to the cutting operation are in fact always constant, the same does not apply to the point of application which moves from left to right along the entire cutting line. It accordingly follows that the bending stresses increase from left to center and then decrease. However, since the torsional stress exerted on the lower support box 6 also increases to the center and then decreases over the same period of time, there is always practically total compensation for deformations, which is in fact the object to be achieved.

In order to guard against any danger of ovalization of the support box 6 at the time of torsional displacements of this latter, provision can advantageously be made for one or a number of intermediate partitions 26 within said box and each partition can be provided with an opening 27. Said support box may also serve as a housing for the reservoir 28 which forms part of the hydraulic circuit for controlling the jacks 13. This circuit comprises in addition a hydraulic set 29 as well as a control unit 30. As shown in FIG. 1, these hydraulic circuit components are advantageously attached to the exterior of the machine on the external face of one of the endplates of the frame, thus ensuring ease of access for maintenance and disassembly operations. The design of this hydraulic circuit need not be described, however, since it can be identical with those usually provided on conventional shearing machines.

Preferably, the shearing machine in accordance with the invention is also equipped with a system for adjusting its cutting angle, that is to say the angle $\alpha$ formed by the movable blade 9 with respect to the horizontal. As shown in FIG. 4, this system can be constituted by a movable stop 31 having a number of bearing notches of different depth, each notch being capable of cooperating with a resilient stop 32 carried by the higher end of the upper apron 10. Thus the adjustment can be performed by operating the movable stop 31 by hand in order to place either of these notches opposite to the stop 32.

However, as illustrated in FIG. 5, this manual control system can be replaced by a movable stop 33 constituted by a linear jack actuated by an electric motor 34. As in the previous instance, said stop is placed opposite to the resilient stop 32 carried by the movable apron 10.

What is claimed is:

1. A hydraulic shearing machine comprising: a frame having first and second vertical end plates, an apron movably secured to said frame, an upper cutting blade secured to said movable apron, a hollow box having first and second ends rigidly secured to said first and second vertical end plates, respectively, and a lower cutting blade fixed to one of the side walls of said box, said upper and lower cutting blades being mounted in opposition to one another, and said hollow box being mounted for twisting movement about an axis parallel to and spaced a substantial distance from said lower cutting blade, whereby the vertically downward force exerted on said lower cutting blade during a cutting operation will cause said box to twist about said axis, this twisting producing a continuously varying horizontal displacement of said lower cutting blade which substantially cancels the opposed continuously varying horizontal displacement of said lower cutting blade caused by the horizontal forces exerted on said lower cutting blade during a cutting operation.

2. A hydraulic shearing machine according to claim 1, and two jacks disposed at opposite ends of said movable apron and having a point of application set back with respect to the position of said upper cutting blade, said two jacks acting to displace said movable apron downwardly, said movable apron being rearwardly inclined from its bottom so.

* * * * *